ARRANGEMENT FOR VARYING THE RESISTANCE VALUE
OF PHOTO-SENSITIVE DEVICES

Filed Jan. 3, 1967

INVENTOR.
WILLIAM ROSS AIKEN
BY
Kurt Hanchen

United States Patent Office 3,349,319
Patented Oct. 24, 1967

3,349,319

ARRANGEMENT FOR VARYING THE RESISTANCE VALUE OF PHOTO-SENSITIVE DEVICES

William Ross Aiken, 10410 Magdalena Ave., Los Altos Hills, Calif. 94022
Filed Jan. 3, 1967, Ser. No. 606,680
6 Claims. (Cl. 323—21)

ABSTRACT OF THE DISCLOSURE

A quickly responding arrangement for varying the resistance value of a photo-sensitive resistance device employing a lamp to illuminate the resistance device wherein the power circuit for the lamp uses a transistor as current flow control element and includes one or more resistors shunted by relatively small capacitors, connected in series with the lamp.

This is a continuation-in-part of my copending U.S. patent application Ser. No. 458,649 filed on May 25, 1965, for an Arrangement for Controlling the Resistance Value of Environment-Sensitive Resistance Devices.

The present invention relates to photo-sensitive resistance devices, i.e. devices whose resistance values change when they are exposed to illumination. Devices of this type are frequently used in voltage stabilizer or limiter arrangements wherein the resistance value of the photo-sensitive resistor element is controlled by the volume of the signal or signals that are passed through the arrangement, in such a manner that the output volume of the arrangement does not rise beyond a desired level irrespective of changes in the volume of the applied signal. For successful use of photo-sensitive resistance devices in such arrangements, their response to changes in their illumination is frequently too slow, unless they are of the high cost variety and/or unless the means for illuminating them are operated by high voltages and are of the variety that will stand energization by high voltages.

It is an object of my invention to provide arrangements for controlling the resistance value of photo-sensitive resistance devices of the type referred to, that obtain a quick response with low voltages even though the resistance devices and the means for illuminating them are of the slowly responding variety.

Figure 1:
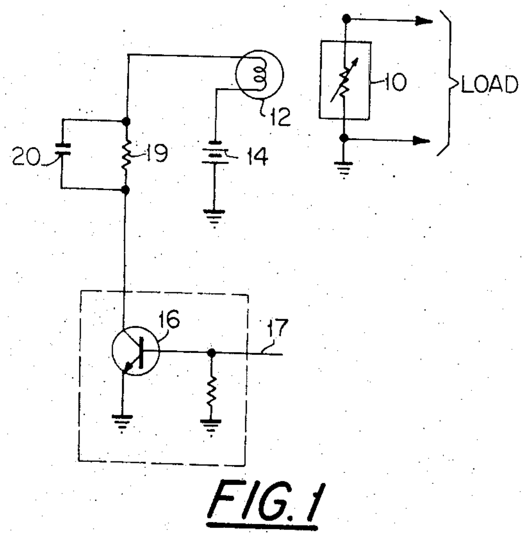
Figure 2:
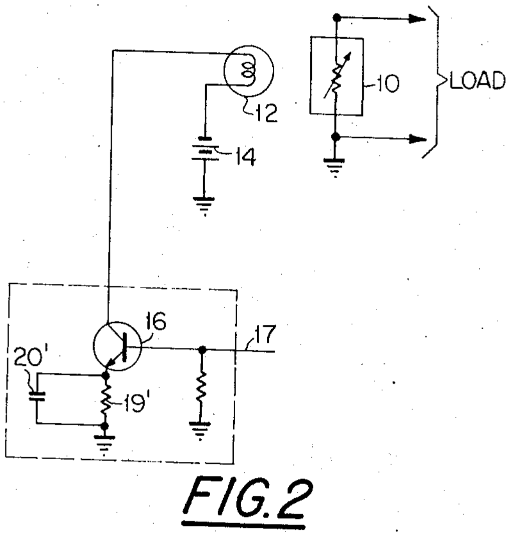
Figure 3:
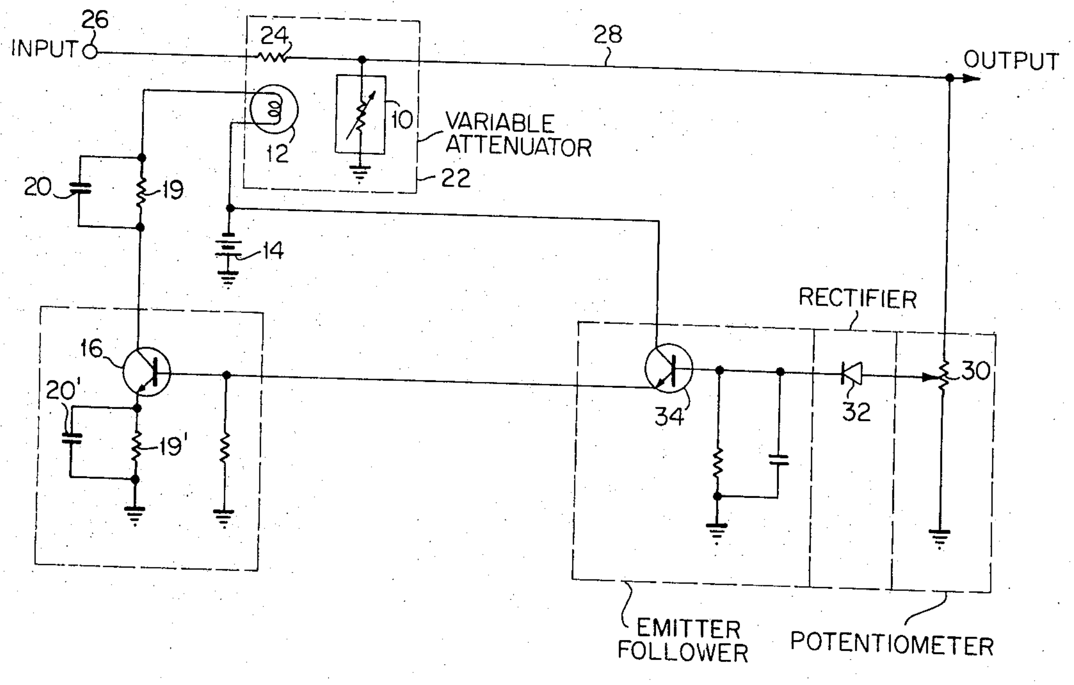

This and other objects of the present invention will be apparent from the following description of the accompanying drawings which illustrate certain preferred embodiments thereof and wherein FIGURES 1 and 2 are diagrams of two different embodiments of an arrangement for varying the resistance value of a photo-sensitive resistance device constructed in accordance with the invention; and FIGURE 3 is a circuit diagram of yet another embodiment of the invention shown as part of a volume limiter arrangement.

In FIGURE 1 the reference numeral 10 identifies a photo-sensitive resistor, such as a solid state photo cell, that is connected across a load which may be a voltage stabilizing circuitry. The photo-sensitive resistor 10 is exposed to illumination by an adjacently located lamp 12 which may be of the low cost variety that responds relatively slowly to an applied current, such as a common pilot lamp. The lamp may be supplied with power from a suitable source, such as the battery 14, and the power circuit of the lamp employs as switch or current flow control element a transistor 16 whose emitter and collector are connected into said power circuit. When no control current is applied to the base of transistor 16, no current flows in the power circuit of the lamp and the lamp is inoperative. By applying a current of predetermined strength to the base of the transistor 16 along line 17 thus increasing its emitter-to-collector-conductivity to a controlled degree, current flow may be initiated in the power circuit of the lamp to a degree whereat the lamp is about to light up or whereat its brightness is at a threshold value at which the resistance value of the photo-sensitive resistance device 10 is about to change or has changed to an insignificant degree; and by increasing the strength of the control current applied to the base of transistor 16, the lamp may be caused to light up brightly and effect a desired change in the resistance value of the photo resistor 10.

When resistance varying arrangements of the type described employ slowly responding lamps and/or slowly responding photo-resistors for reasons of economy, the time required for the lamp to light up with an increase in the control current applied to the base of the transistor and the resultant change in the resistance value of the photo-resistor may be too slow to provide satisfactory performance; for instance when the arrangement is used in voltage stabilizers or limiters, the "attack time" of these arrangements may be too long for satisfactory performance. In accordance with the invention I therefore place a resistor 19 shunted by a capacitor 20 into the power circuit of the lamp. The size of the resistor 19 is so chosen that when the proper control current is applied to the base of transistor 16, the resultant current flow in the power circuit, once it has reached its full level, is sufficient for the lamp 12 to provide the required degree of illumination, i.e. the degree of illumination that sets the value of the photo resistor 10 to the required level. The capacitor 20 is shunted across resistor 19 to provide a brief period during which the lamp 12 is over-voltaged so that it may rapidly rise to the desired level of brightness whenever a control current is applied to the base of the transistor, or is increased in strength. Whenever this occurs the increased emitter-to-collector-conductivity of the transistor initiates, or increases, current flow in the power circuit of the lamp 12, and during this initiate phase in the change of conductivity of the current flow control element 16, the capacitor 20 acts as a direct current path so that a strong surge of current path so that a strong surge of current passes through the lamp 12. By proper choice of the source of power 14 and the size of capacitor 20 this current surge may be caused to over-voltage the lamp 12 briefly so that its degree of illumination rises quickly to the required level. By proper choice of the size of capacitor 20, i.e. by employing a relatively small capacitor, this phase in the operation of the arrangement is kept short and may be kept so short that the brightness of the lamp does not become excessive; and as soon as the capacitor 20 is charged to the level determined by the initiated current flow in the power circuit of the lamp, it acts as an infinite resistance; and it is now the resistor 19 in combination with the resistance value of the current flow element 16 and the internal resistance of the lamp 12 which determine the current flow in the power circuit of and hence the continued degree of brightness of the lamp. Thus, the circuit arrangement provides a rapid rise in the illumination of the lamp 12 to the required level—even though the lamp may be of the inexpensive, slowly responding variety—followed by continued maintenance of the required illumination level. In fact, by proper choice of the size of capacitor 20, resistor 19 and the strength of the source of power 14 the circuit arrangement of my invention may be adapted to provide a brief phase in which the lamp is excessively illuminated thus operating to compensate for the inertia of slowly reacting photo-sensitive resistors.

In the embodiment of the invention illustrated in FIGURE 1, the resistor 19 shunted by capacitor 20 is interposed between the lamp 12 and the collector electrode of the current flow control transistor 16. Equally satisfactory results may be obtained when the capacitor-shunted resistor 19'/20' is interposed between the emitter electrode of the current flow control transistor and ground, as illustrated in FIGURE 2. In fact best performance has been obtained when a capacitor-shunted resistor is provided in both the collector circuit and the emitter circuit of the transistor 16, as illustrated in FIGURE 3.

FIGURE 3 also illustrates the use of the resistance varying arrangement of my invention as part of a voltage stabilizing circuitry. The numeral 22 identifies a variable attenuator composed of a fixed resistor 24 and a photo-sensitive resistor 10 connected in series between the signal input means 26 and ground. The voltage developed across the photo-sensitive resistor element 10 appears as the output signal in line 28. A part of said voltage determined by the setting of a potentiometer 30 is converted into a D.C. signal by a rectifier indicated at 32. The converted voltage is applied to the base of a transistor 34 which is connected to operate as an emitted follower and controls the flow of a biassing current from the source of power 14 to the base of the transistor 16, which is employed as current flow control element in the power circuit of the lamp 12, as described hereinbefore.

Whenever the volume of a signal applied to the input of attenuator 22 rises, the output voltage of said attenuator in line 16 also rises initially. Part of the output, depending on the setting of potentiometer 30, is converted into a direct current signal in rectifier 32. The output of rectifier 32 is applied to the base of transistor 34, and the D.C. current rise supplied by the emitter of transistor 34 is delivered to the base of transistor 16. As the increasing direct current is applied to the base of transistor 16, the emitter-to-collector-conductivity of said transistor is correspondingly increased. For the brief moment during which the current applied to the base of transistor 16 rises and the emitter-to-collector-conductivity of said transistor rises correspondingly, the power circuit of lamp 12 reacts momentarily as if capacitors 20 and 20' were D.C. paths which short-circuit the resistors 19 and 19', respectively. Consequently an extra strong current surge passes through the lamp 12 causing it to brighten rapidly to the level required for providing compensation for the increase in the volume of the applied signal. This is effective to produce an almost instantaneous response of the attenuator to any increase in the volume of an applied signal. As soon as the capacitors 20 and 20' become fully charged, however, they become infinite resistances to the current flowing in the power circuit of lamp 12, and it is now the resistors 19 and 19' in combination with the internal resistance of the lamp and the collector-to-emitter-conductivity of transistor 16 as established by the control current applied to the transistor base, which determine the size of the current flow in the power circuit of the lamp 12. As a result thereof the current flow in said circuit drops quickly to an appropriately lower level at which the lamp remains at the proper brightness to provide the proper compensation for the increased volume level of the applied signal.

While I have illustrated my invention with the aid of certain exemplary embodiments thereof, it will be understood that the invention is not limited to the specific circuit components shown and described by way of example. Thus, it will be understood by those skilled in the art that the principles of my invention may be employed to stabilize the output of volume changers other than the specific attenuator shown and described by way of example, and the control voltage derived from the signal applied to and passing through the volume changer, may be taken off at the input side or at an intermediate point of its path through the volume changer, rather than at the output side thereof.

I claim:

1. A resistance varying circuit arrangement comprising a photo-sensitive resistance element; a lamp for illuminating said element; and a power circuit for said lamp including a current-flow-control element responsive to application of biasing currents, and a resistor shunted by a capacitor.

2. A circuit arrangement according to claim 1 wherein said current-flow-control element is a transistor connected with its emitter electrode and its collector electrode into said power circuit.

3. A circuit arrangement comprising a photo-sensitive resistance element, a lamp for illuminating said element, and a power circuit for said lamp including a transistor connected with its emitter electrode and its collector electrode into said power circuit, and also connected into said power circuit a resistor shunted by a capacitor.

4. Arrangement according to claim 3 wherein said capacitor-shunted resistor is connected between said lamp and the emitter electrode of said transistor.

5. Arrangement according to claim 3 wherein said capacitor-shunted resistor is connected between the emitter electrode of said transistor and ground.

6. Arrangement according to claim 3 including an additional capacitor-shunted resistor, with one of said resistors interposed in the emitter circuit and the other in the collector circuit of said transistor.

References Cited

UNITED STATES PATENTS

| | | | |
|---|---|---|---|
| 3,031,578 | 4/1962 | Colburn | 250—205 |
| 3,210,647 | 10/1965 | Dyke | 323—21 |
| 3,222,572 | 12/1965 | Powell | 315—151 |
| 3,248,642 | 4/1966 | Rothschild | 323—21 |

JOHN F. COUCH, *Primary Examiner.*

W. E. RAY, *Assistant Examiner.*